United States Patent [19]

Fujisawa

[11] Patent Number: 5,550,833
[45] Date of Patent: Aug. 27, 1996

[54] UNIQUE WORD DETECTING APPARATUS AND UNIQUE WORD DETECTING METHOD

[75] Inventor: Yukio Fujisawa, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 391,797

[22] Filed: Feb. 21, 1995

[30] Foreign Application Priority Data

Mar. 1, 1994 [JP] Japan .................... 6-031448

[51] Int. Cl.$^6$ .................... H04J 3/06
[52] U.S. Cl. .................... 370/105.4; 370/365; 370/368
[58] Field of Search .................... 370/105.4, 100.1, 370/105.1, 105.2, 105.3, 105.5, 99, 43, 104.1; 375/354, 362, 365, 366, 367, 368

[56] References Cited

U.S. PATENT DOCUMENTS

| | | | |
|---|---|---|---|
| 3,144,515 | 3/1961 | Kaneko | 370/105.4 |
| 3,641,274 | 2/1972 | Sasaki et al. | 370/105.4 |
| 5,051,989 | 9/1991 | Negishi | 370/104.1 |

*Primary Examiner*—Wellington Chin
*Assistant Examiner*—Huy D. Vu
*Attorney, Agent, or Firm*—Lowe, Price, LeBlanc & Becker

[57] ABSTRACT

A unique word detecting apparatus comprising a preamble code detecting circuit 202 for detecting a preamble code PR to be transmitted before the unique word UW, a unique word detecting circuit 204 for holding in advance the data of the unique word UW to be detected, an error detecting circuit 203 for comparing the external data with the unique word UW successively bit by bit only when and after the preamble code PR is detected and for outputting an error signal E when not coincide, and a unique word detecting circuit 204 for counting the number of outputs of the error signal E and for outputting a detecting signal DT indicating that the unique word UW has been detected when the count value is equal to or smaller than a predetermined value. Only when the preamble code PR transmitted before the unique word UW is detected, the external data ED is compared with the unique word UW successively bit by bit, the number of uncoincident bits is counted, and when the count value is equal to or smaller than a predetermined value, the detecting signal DT indicating that the unique word UW has been detected is outputted.

7 Claims, 7 Drawing Sheets

FIG. 2
PRIOR ART

| R | SS | PR | UW | I |

R: TRANSIENT RESPONCE RAMP TIME
SS: START SYMBOL ('10')
PR: PREAMBLE CODE (REPETITION OF '1001')
UW: UNIQUE WORD
I: COMMUNICATION DATA

UNIQUE WORD DETECTING APPARATUS AND UNIQUE WORD DETECTING METHOD

BACKGROUND OF THE INVENTION

1. Field of the Invention

This invention relates to a unique word detecting apparatus and method for detecting a unique word in digital communication using a time division multiple access method (hereinafter called the "TDMA method") for a cordless telephone, that is, a personal handy-phone system (PHS), which is still simpler than a mobile-phone which has been gaining popularity in recent years.

The PHS standard is specified as "STD-28" standard by the Research and Development Center for Radio System (RCR), which is an affiliated agency of the Ministry of Posts and Telecommunications in Japan.

2. Description of the Prior Art

FIG. 1 is a block diagram showing a configuration example of a conventional unique word detecting apparatus for detecting a unique word specified in "STD-28" of the above-mentioned RCR.

In FIG. 1, reference numeral 1 shows a 32-bit shift register, in which 32 pieces of cascade-connected D-latch indicated by reference numeral 1-0 through 1-31 are arranged. To the 32-bit shift register 1, a clock CLK and an external data ED are externally inputted, the clock CLK is inputted to each of D latches 1-0 through 1-31, and the external data ED is inputted in:to the D latch 1-0. Consequently, because 32 pieces of D latch 1-0 through 1-31 input and hold the external data ED bit by bit in synchronism with the clock CLK, a total of 32 bits of data are held in the 32-bit shift register 1.

Reference numeral 2, and 3-0 through 3-31 all indicate coincidence detecting circuits.

The coincidence detecting circuit 2 stores a 32-bit unique word UW specified in the "STD-28" standard of the above RCR and compares the 32-bit data held by the 32-bit shift register 1 with it bit by bit, and outputs a coincidence detecting signal CD when all 32 bits coincide.

32 pieces of coincidence detecting circuits 3-0 through 3-31 stores a unique word for comparison (hereinafter called the "comparison word") with an error in 1 bit, which differs from the original 32-bit unique word UW, respectively, and compares the comparison words UW-0 through UW-31 with the data held by the 32-bit shift register 1 bit by bit, and outputs the coincidence detecting signal CD when all the 32 bits coincide.

An internal construction of each coincidence detecting circuit 2, 3-0 through 3-31 is, in principle, common.

That is, in each of the coincidence detecting circuits 2, 3-0 through 3-31, a memory circuit indicated by reference numeral 4, and 5-0 through 5-31 is installed, respectively, and in addition, an XNOR gate indicated by reference numeral 100 through 131 and an AND gate indicated by reference numeral 132 are installed, respectively.

The memory circuit 4 installed to the coincidence detecting circuit 2 stores the original 32-bit unique word UW The memory circuits 5-0 through 5-31 installed to the coincidence detecting circuits 3-0 through 3-31, respectively, store 32-bit comparison words UW-0 through UW-31 with an error in 1 bit, respectively (in the case of the example shown in FIG. 1, the comparison word UW-0 with an error in the 0th bit is stored in the memory circuit 5-0 installed to the coincidence detecting circuit 3-0 and the comparison word UW-31 with an error in the 31st bit is stored in the memory circuit 5-31 installed to the coincidence detecting circuit 3-31).

The XNOR gates 100 through 131 of each of the coincidence detecting circuits 2, 3-0 through 3-31 detect, respectively, whether the 0th-bit through 31st bit of the data stored in the D latches 1-0 through 1-31 of the 32-bit shift register 1 coincide with the 0th bit through the 31st bit of the unique word UW or comparison word UW-0 through UW-31. The AND gate 132 of each coincidence detecting circuits 2, 3-0 through 3-31 outputs the coincidence detecting signal CD when all the XNOR gates 100 through 131 detect coincidence. With this operation, in each of the coincidence detecting circuits 2, 3-0 through 3-31, whether the unique word UW and comparison words UW-0 through UW-31 coincide with the 32-bit data stored in the 32-bit shift register 1 is detected.

In addition, reference numeral 6 indicates an OR gate to which the coincidence detecting signals CD of all the coincidence detecting circuits 2, 3-0 through 3-31 are inputted. Reference numeral 7 indicates a D latch to which the output signals of the OR gate 6 and clock CLK are inputted and which latches the output of the OR gate 6 at the falling edge of the clock CLK. Consequently, when a coincidence detecting signal CD is outputted from at least either one of the coincidence detecting circuits 2, 3-0 through 3-31, the OR gate 6 outputs the detecting signal indicating that the unique word has been detected and the D latch 7 latches the output of the OR gate 6 at the falling edge of the clock CLK.

Now, description is made on the operation of a conventional unique word detecting apparatus with the above-mentioned configuration.

First of all, the 32-bit shift register 1 inputs the external data (TDMA frame data), as shown in FIG. 2, bit by bit in synchronism with the external clock CLK and latches the 32-bit data as a whole.

The TDMA frame data shown in FIG. 2 is specified by the "STD-28" standard of RCR as mentioned above and consists of ramp time (R) for transient response, start symbol (SS), preamble code (PR) which is a repetition of "1001," unique word (UW), and finally original communication data (I) in that order.

By the way, when the Latest external data ED is inputted through the D latch 1-0, the data held in each of the D latches 1-0 through 1-31 is shifted to the D latch on the right successively (for example, the data of the D latch 1-0 is inputted to the D latch 1-1 and the data of the D latch 1-1 is inputted to the D latch 1-2).

Each of the coincidence detecting circuits 2, 3-0 through 3-31 always checks bit-by-bit coincidence/uncoincidence of the 32-bit unique word UW and comparison word UW-0 through UW-31 with the 32-bit data held in the 32-bit shift register 1.

That is, XNOR gates 100 through 131 of each of the coincidence detecting circuits 2, 3-0 through 3-31 compare the 32-bit unique word UW and comparison words UW-0 through 31 with the 32-bit data held in the 32-bit shift register 1 bit by bit. For example, the XNOR gate 100 of each of the coincidence detecting circuits 2, 3-0 through 3-31 compares the data (0th bit) stored in the D latch 1-31 with the 0th bit of the unique word UW and comparison words UW-0 through UW-31, respectively. In each of the coincidence detecting circuits 2, 3-0 through 3-31, only when all the XNOR gates 100 through 131 detect coincidence, the AND gate 132 outputs the coincidence detecting signal CD.

The reason why 33 pieces of coincidence detecting circuit 2, 3-0 through 3-31 are prepared is as follows. In case of digital communication based on the TDMA method, the above-mentioned "STD-28" standard of the RCR specifies that the data shall be made effective as if the original unique word is transmitted, not only when the transmitted unique word completely coincides with the original unique word UW but also even when an error is found in 1 bit only, in other words, when the 32-bit data held in the 32-bit shift register 1 coincides with any of the comparison words UW-0 through UW-31 stored in each one of the coincidence detecting circuits 3-0 through 3-31.

The OR gate 6 judges that the unique word is detected when the coincidence detecting signal CD is outputted from any of the coincidence detecting circuits 2, 3-0 through 3-31 and outputs the detecting signal indicating that the unique word has been detected. The detecting signal outputted from the OR gate 6 is inputted to the D latch 7 and latched at the falling edge of the next clock at and after that time point and outputted to the outside.

As described above, a conventional unique word detecting apparatus is designed to output the detecting signal indicating that the unique word has been detected in the case where when the error is only 1 bit even when the transmitted unique word does not completely coincide with the original unique word UW. For this reason, 33 pieces of coincidence detecting circuit with 32 pieces XNOR gates, respectively, are required, and the total of the XNOR gates which these coincidence detecting circuits 2, 3-0 through 3-31 possess exceeds 1000 pieces. In such an extremely large circuit scale, upsizing of the apparatus and increase in power consumption are certain to result, generating a fear of running counter to the original spirit of developing handy cordless telephones.

Because the conventional unique word detecting apparatus is not provided with means for recognizing the timing of the unique word transmission, it is necessary to judge whether the unique word is transmitted or not, every time the external data is inputted one bit to the 32-bit shift register 1. Consequently, when such judgment is made by a computer, etc., loads to the computer become so great that there is a fear for affecting other processing.

In addition, when the unique word to be transmitted is changed or the apparatus is applied to other standard, it is impossible to detect the changed unique word or that with a different standard unless the configuration is changed.

SUMMARY OF THE INVENTION

In view of the circumstances as described above, it is a primary object of this invention to provide a unique word detecting apparatus and a unique word detecting method which can detect the unique word in a smaller circuit scale and with the apparatus downsized.

It is also an object of this invention to provide a unique word detecting apparatus and a unique word detecting method which can recognize the transmission timing of the unique word and reduce loads to computers, etc. to prevent any detrimental effects on other processing.

In addition, it is an another object of this invention to provide a unique word detecting apparatus which can detect the unique word changed without changing the configuration, even when the unique word to be detected is changed.

It is a still another object to provide a unique word detecting method which can eliminate detection processing of the unique word in the period other than that when the unique word is transmitted.

The first, fourth and fifth aspects of the unique word detecting apparatus according to the invention comprises preamble code detecting means for detecting a preamble code transmitted prior to a unique word, unique word holding means for holding a data of the unique word to be detected inadvance, error detecting means for outputting an error signal when the external data is compared with the unique word successively bit by bit and does not coincide only after the preamble code is detected, and unique word detecting means for counting the number of outputs of error signal and for, when the count value is equal to or smaller than a predetermined value, outputting a detecting signal which indicates that the unique word is detected.

Consequently, only when the preamble code transmitted prior to the unique word is detected, the external data and the unique word are compared successively bit by bit and the number of uncoincident bits is counted, and when the count value is equal to or smaller than the predetermined value, a detecting signal indicating that the unique word is detected is outputted.

The second aspect of the unique word detecting apparatus according to the invention comprises, in the unique word detecting means, a counter for comparing the data with the unique word successively bit by bit, counting the number of uncoincident bits, and outputting the uncoincidence signal when the count number reaches 2.

Consequently, because the detecting signal which indicates that the unique word is detected when an error is 1 bit or less is outputted, it can correspond the TDMA digital communication which makes the data effective as if the original unique word is transmitted.

The third aspect, of the unique word detecting apparatus according to this invention is provided with changing means for changing the data stored as the unique word UW to be detected.

Consequently, even when the unique word to be transmitted is changed or the apparatus is applied to a different standard, the changed unique word or that of the different standard can be detected without changing the configuration.

The fourth aspect of the unique word detecting apparatus according to the present invention uses a ROM as unique word holding means.

The fifth aspect of the unique word detecting apparatus according to the present invention uses a wired circuit as unique word holding means.

The unique word detecting method according to the invention compares the previously stored preamble code with the transmitted data, and when coincides, that is, only when the preamble code is detected, the unique word is detected thereafter.

The above and further objects and features of the invention will more fully be apparent from the following detailed description with accompanying drawings.

BRIEF DESCRIPTION OF THE DRAWINGS

FIG. 2 is a data diagram showing a data of the TDMA frame;

DESCRIPTION OF THE PREFERRED EMBODIMENTS

First Embodiments

Now, the first embodiment according to the present invention will be described with reference to the accompanying drawings.

Figure 1:
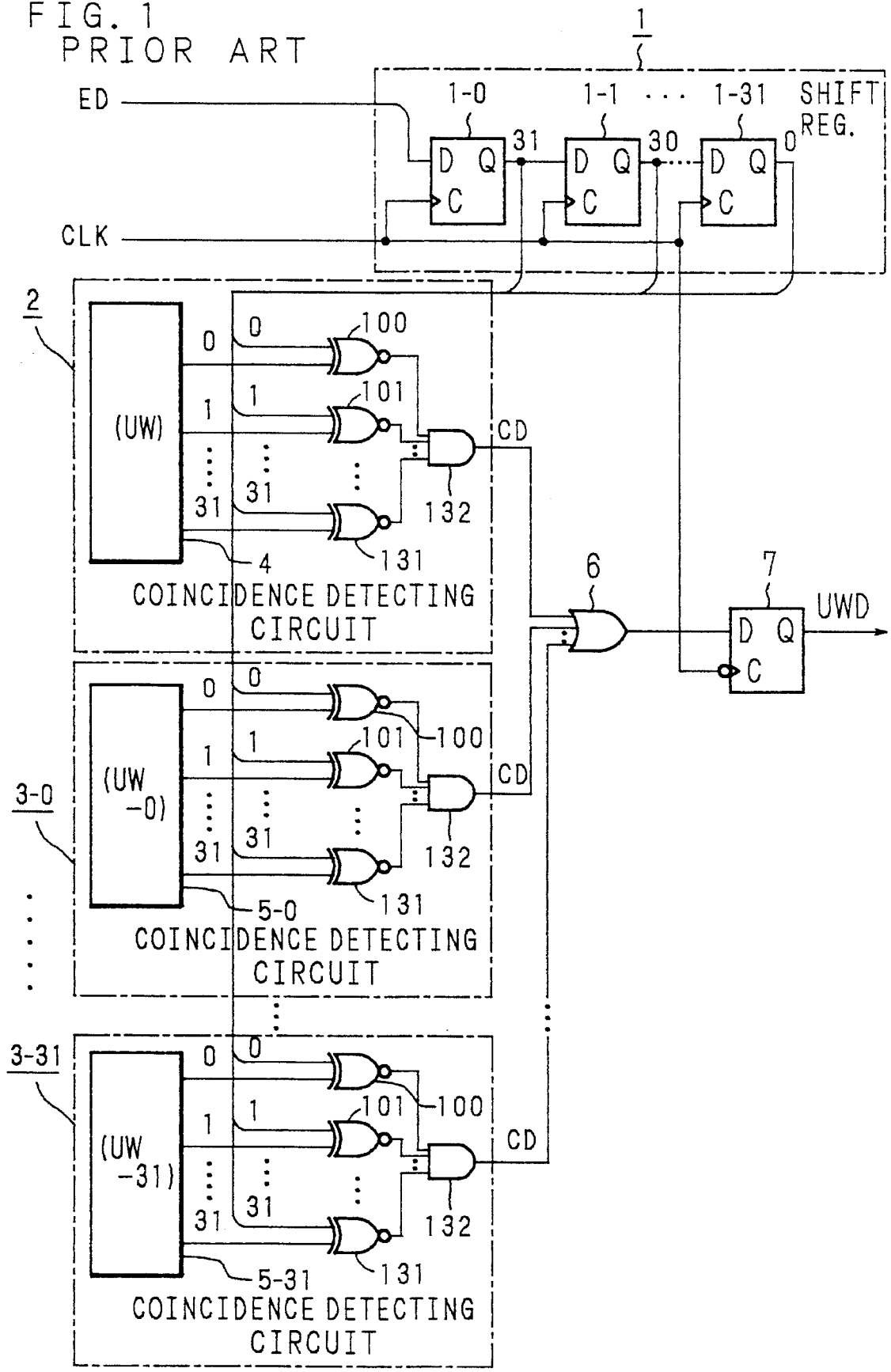
FIG. 1 is a block diagram showing a configuration example of a conventional unique word detecting apparatus.
Figure 3:
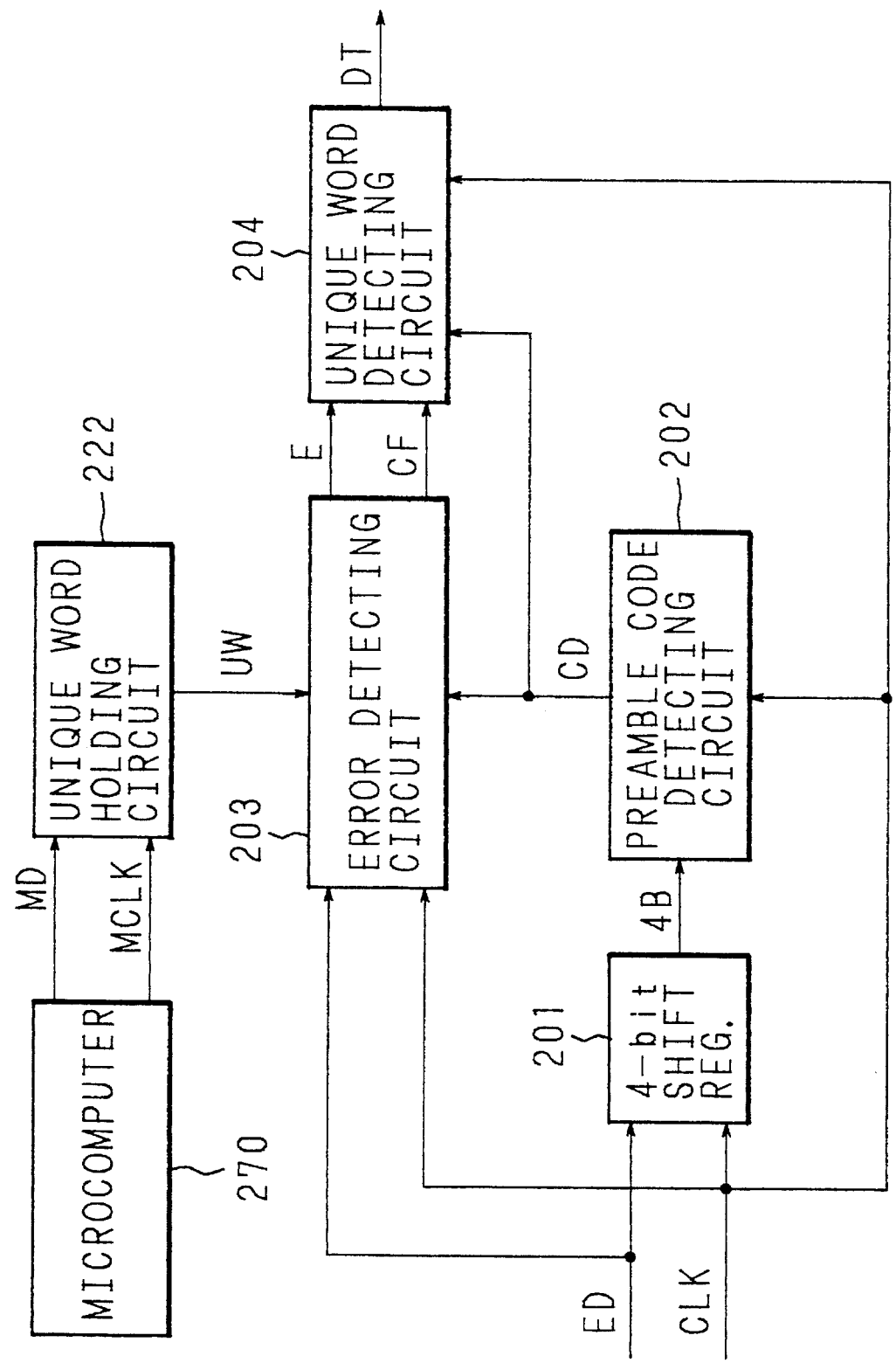
FIG. 3 is a block diagram showing a configuration example of the first embodiment of the unique word detecting apparatus according to the present invention.

FIG. 3 is a block diagram showing a configuration example of the first embodiment of the unique word detecting apparatus according to the present invention.

In FIG. 3, reference numeral 201 denotes a 4-bit shift register which functions as data holding means. To this 4-bit shift register 201, a clock CLK and an external data ED are inputted. The 4-bit shift register 201 inputs the external data ED in synchronism with the clock CLK bit by bit and holds 4-bit data.

Reference numeral 202 denotes a preamble code detecting circuit which functions as preamble code detecting means. To the 4-bit register 201, the clock CLK and the data 4B outputted by 4 bits each from the above-mentioned 4-bit shift register 201 are inputted. The preamble code detecting circuit 202 stores one unit "1001" of the preamble code PR (repetition of "1001") transmitted prior to the unique word UW of the external data ED and at the same time, compares the preamble code PR with the 4-bit data 4B held by the 4-bit shift register 201 and when coincides, outputs the coincidence detecting signal CD.

Reference numeral 222 denotes the unique word holding circuit which functions as unique word holding means and to which a microcomputer data MD and microcomputer clock MCLK outputted from the microcomputer 270 later described are inputted. The unique word holding circuit 222 holds the 32-bit data of the unique word UW to be detected, which is given from the microcomputer 270 as a microcomputer data MD at the start-up of the apparatus.

Reference numeral 203 denotes an error detecting circuit which functions as error detecting means. To the error detecting circuit 203, the clock CLK, the coincidence detecting signal CD which is outputted from the above-mentioned preamble code detecting circuit 202 and the data of the unique word UW which is held by the above-mentioned unique word holding circuit 222 are inputted.

The error detecting circuit 203 inputs the external data ED bit by bit in synchronism with the clock CLK when the coincidence detecting signal CD is given from the preamble code detecting circuit 202, and at the same time, reads the data of the unique word UW to be detected from the unique word holding circuit 222 and compares both data successively bit by bit, and when they do not coincide, it outputs the error signal E. When the comparison of 32-bit data is finished, the error detecting circuit 203 outputs the comparison finish signal CF.

Reference numeral 204 denotes the unique word detecting circuit 204 which functions as unique word detecting means. To the unique word detecting circuit 204, the clock CLK as well as the error signal E which is outputted from the above-mentioned preamble code detecting circuit 202 and the comparison finish signal CF which is outputted from the above-mentioned error detecting circuit 203 are inputted. The unique word detecting circuit 204 begins counting the number of outputs of the error signals E outputted from the error detecting circuit 203 when the coincidence detecting signal CD is given from the preamble code detecting circuit 202 and stops counting when the comparison finish signal CF is given from the preamble code detecting circuit 202. And the unique word detecting circuit 204 outputs the detecting signal DT indicating that the unique word has been detected when the count value is 1 or less, that is, 1 or 0, when the comparison finish signal CF is given.

The microcomputer 270 functions as changing means. The microcomputer 270 outputs the data after being changed and allows the unique word holding circuit 222 of the error detecting circuit 203 to store the changed unique word newly when the unique word UW to be detected by the unique word detecting apparatus of the present invention is changed.

Figure 4:
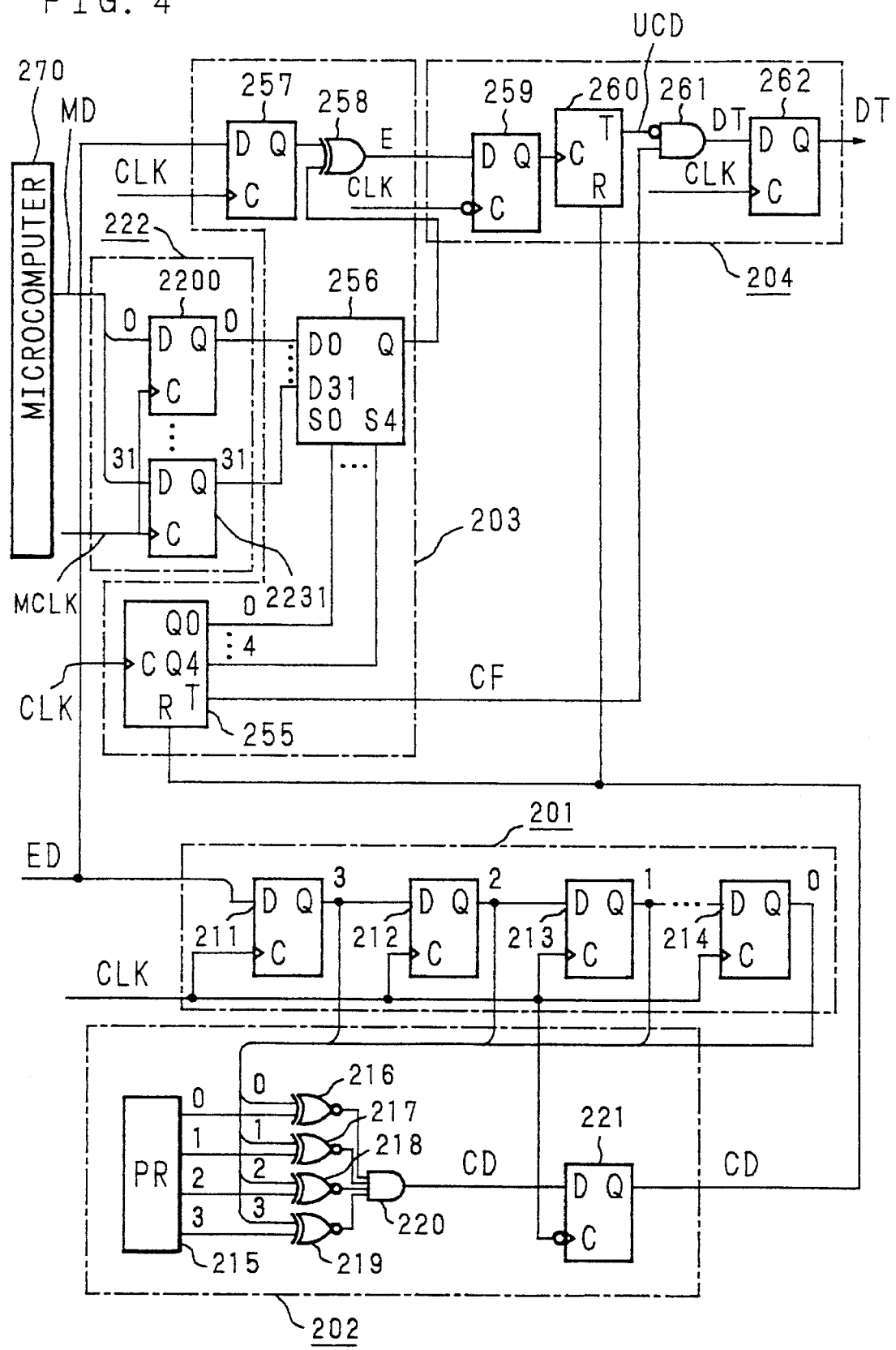
FIG. 4 is a circuit diagram showing a detailed configuration example of the first embodiment of the unique word detecting apparatus according to the present invention.

FIG. 4 is a circuit diagram showing a detailed configuration of the unique word detecting apparatus according to the present invention shown in the form of a block diagram in FIG. 3.

The 4-bit shift, register 201 primarily consists of four D latches indicated with reference numeral 211 through 214. These D latches 211 through 214 are cascade-connected, the clock CLK is inputted to each of the D latches 211 through 214, and the external data ED is inputted to the D latch 211. Consequently, because four D latches 211 through 214 input and hold the external data ED bit by bit in synchronism with the clock CLK, a total of 4 bits of data are held in the 4-bit shift register 201.

The preamble code detecting circuit 202 comprises a storing circuit 215, 4 pieces of XNOR gate 216 through 219, an AND gate 220 and a D latch 221. The storing circuit 215 stores the preamble code PR to be detected. To the four XNOR gates 216 through 219, 4 bits of preamble code PR stored by the storing circuit 215 and 4 bits of the data held in the 4-bit shift register 201 are inputted, respectively, where coincidence of both is detected.

Outputs of the above-mentioned four XNOR gates 216 through 219 are inputted to the AND gate 220, which outputs the coincidence detecting signal CD when all of these detect the coincidence.

To the D latch 221, the clock CLK and the output signal of the above-mentioned AND gate 220 are inputted, and the D latch 221 latches the out, put signal of the AND gate 220 and outputs it outside the preamble code detecting circuit 202 at every time of falling of the clock CLK.

The unique word holding circuit 222 primarily comprises 32 pieces of D latches 2200 through 2231, each of which holds the value of each bit of the unique word UW, in this first embodiment. To each of D latches 2200 through 2231, each bit of 32 bits of the unique word UW is given as a microcomputer data MD from the microcomputer 270 in addition to an operation clock MCLK of the microcomputer 270.

The error detecting circuit 203 comprises a 32-numeral system counter 255, a multiplexer 256, an input data latch 256, an XOR gate 258 and the like.

To the 32-numeral system counter 255, the clock CLK is given as a count source and the coincidence detecting signal CD outputted from the D latch 221 of the above-mentioned preamble code detecting circuit 202 is given as a reset signal. The 32-numeral system counter 255 is reset by the coincidence detecting signal CD outputted from the D latch 221 and counts the clock CLK from 0 to 31. The count value by the 32-numeral system counter 255 is outputted in the binary notation, that is, 5-bit signal Q0 through Q4. The 32-numeral system counter 255 outputs the comparison finish signal CF when the clock CLK is inputted after its own measurement value becomes 31.

To the multiplexer 256, the clock CLK, the 5-bit output signal Q0 through Q4 of the above-mentioned 32-numeral system counter 255, and the data held by each of the D latches 2200 through 2231 of the unique word holding circuit 222, respectively, are inputted. The multiplexer 256 reads the bit value of the unique word UW corresponding to the count value given from the 32-numeral system counter 255, that is, the value held by the D latches 2200 through 2231 of the unique word holding circuit 222.

To the input data latch 257, the clock CLK and the external data ED are inputted. The input data latch 257 inputs the external data ED successively bit, by bit in synchronism with the clock CLK to hold.

The XOR gate 258 compares the bit value of the unique word UW read by the multiplexer 256 with the data held in the input data latch 257, and outputs the error signal E when they do not coincide.

The unique word detecting circuit 204 comprises an input error latch 259, a binary counter 260, an AND gate 261, D latch 262 and the like.

To the input error latch 259, the clock CLK and the error signal E outputted from the XOR gate 258 of the error detecting circuit 203. The input error latch 259 latches the error signal E outputted from the XOR gate 258 at the falling edge of the clock CLK when the error signal E is outputted.

To the binary counter 260, the signal held by the input error latch 259 is inputted as a count source, and the coincidence detecting signal CD outputted from the D latch 221 of the preamble code detecting circuit 202 as a reset signal, respectively. The binary counter 260 is reset by the coincidence detecting signal CD outputted from the D latch 221 and counts from 0 to 2 every time the error signal E is outputted from the input error latch 259, and outputs the uncoincidence signal UCD when the count value becomes 2.

To the AND gate 261, the uncoincidence signal UCD outputted from the above-mentioned binary counter 260 and the comparison finish signal CF outputted from the 32-numeral system counter 255 of the above-mentioned error detecting circuit 203 are inputted. The AND gate 261 outputs the detecting signal DT indicating that the unique word has been detected when the comparison finish signal CF indicating that comparison of the error detecting circuit 203 is finished is given from the 32-numeral system counter 255 and the uncoincidence signal UCD is not outputted from the binary counter 260.

To the D latch 262, the clock CLK and the detecting signal DT outputted from the above-mentioned AND gate 261 are given. The D latch 262 latches the detecting signal DT outputted from the AND gate 261 at the rising edge of the clock CLK, and outputs it to the outside.

Figure 5:
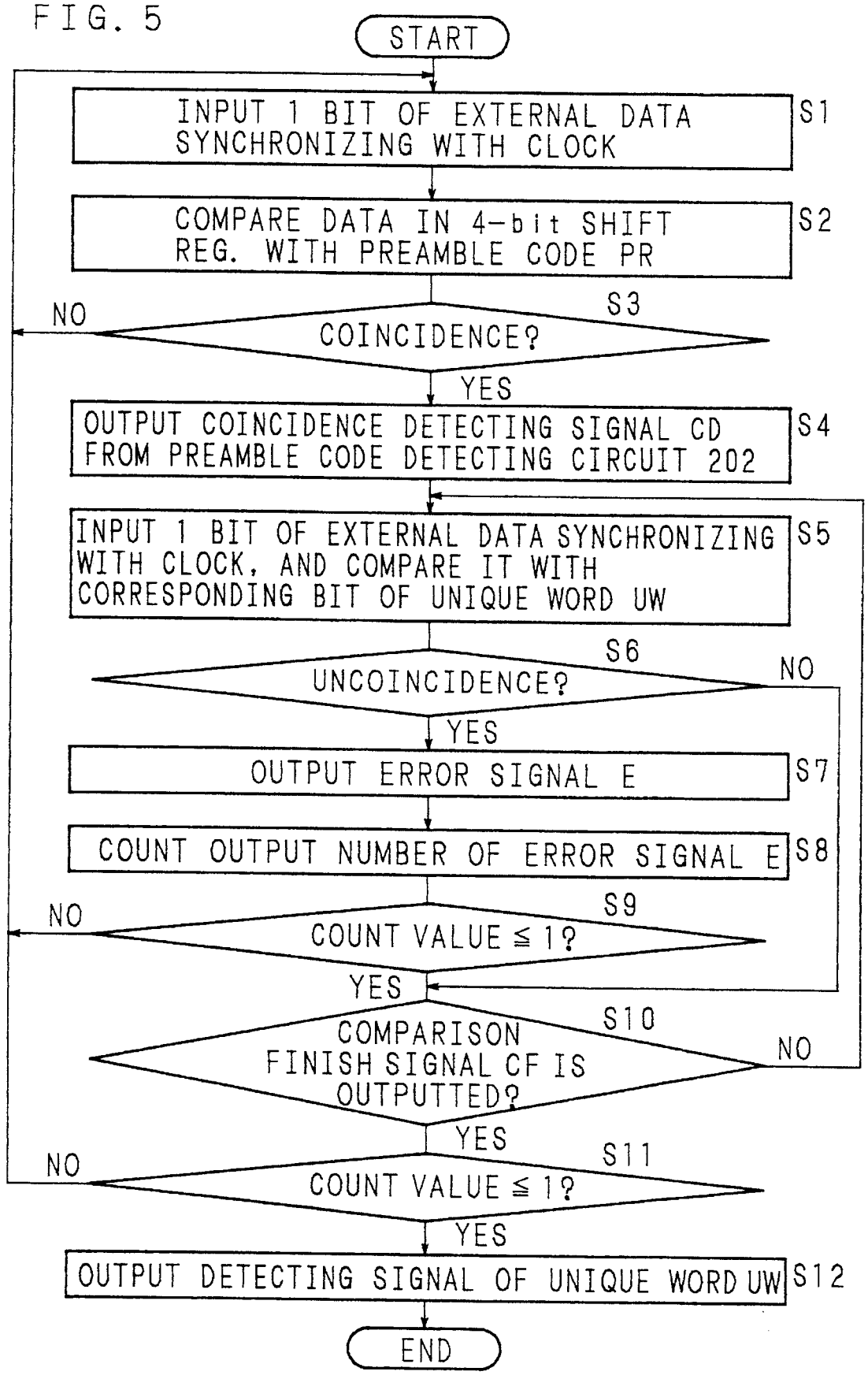
FIG. 5 is a flow chart showing the operation of the first embodiment of the unique word detecting apparatus according to the present invention, that is, the unique word detecting method according to the present invention.

Next description is given on the operation of the unique word detecting apparatus according to the present invention as described above, that is, the unique word detecting method of the present invention with reference to the flow chart of FIG. 5.

To each of D latches 2200 through 2231 of the unique word holding circuit 222, each value of 32 bits of the unique word UW is outputted as the microcomputer data MD from the microcomputer 270 and is held in advance in synchronism with the microcomputer clock MCLK.

In the digital communication based on the TDMA method, as shown in FIG. 2, because the preamble code PR is transmitted before the unique word UW is transmitted, it is possible to recognize the transmission timing of the unique word UW by detecting the preamble code PR.

Consequently, detection of the preamble code PR is carried out as follows by the preamble code detecting circuit 202. At the 4-bit shift register 201, the external data ED is inputted bit by bit in synchronism with the clock CLK and the 4-bit data is constantly latched by D latches 211 through 214 (Step ST1) inside. By the way, when the latest one bit of the external data ED is inputted to the D latch 211, the data of each of the D latches 211 through 214 is shifted successively to the D latch on the right side. For example, the data of the D latch 211 is inputted to and held by the D latch 212, the data of the D latch 212 to the D latch 213, and the data of the D latch 213 to the D latch 214, respectively. At the same time, the data held by each of the D latches 211 through 214 is also given to the XNOR gates 216 through 219, respectively.

The preamble code detecting circuit 202 checks whether the 4-bit preamble code PR stored in advance in the storing circuit 215 coincides or not with the 4-bit data held in the 4-bit shift register 201 (Step ST2).

Specifically, the XNOR gates 216 through 219 of the preamble code detecting circuit 202 check bit by bit the 4-bit preamble code PR and the 4-bit data held in the 4-bit shift register 201 for coincidence or uncoincidence. For example, at the XNOR gate 218, coincidence or uncoincidence is checked between the data (second bit) stored in the D latch 212 and the second bit of the preamble code PR.

Only when all the XNOR gates 216 through 219 detect coincidence, the AND gate 220 outputs the coincidence detecting signal CD (Step ST3 and Step ST4). The coincidence detecting signal CD is inputted to the D latch 221, and is latched and outputted outside at the falling edge of the clock CLK.

In other words, processing from Step ST1 through ST3 is repeated until the 4-bit data held in the 4-bit shift, register 201 completely coincides with the preamble code PR.

When the coincidence detecting signal CD is outputted from the preamble code detecting circuit 202, the error detecting circuit 203 inputs the external data ED bit by bit, in synchronism with the clock CLK as well as compares the external data ED with the unique word UW successively bit by bit, and outputs the error signal E in the case where they do not coincide (Step ST5 through Step ST7).

That is, the 32-numeral system counter 255 begins counting from 0 to 31 with the clock CLK as a count source after once it is reset when the coincidence detecting signal CD is outputted from the preamble code detecting circuit 202, and gives the count value to the multiplexer 256. The multiplexer 256 reads the bit value from the 0th bit through the 31st bit of the unique word UW corresponding to the count value at each point of time of the 32-numeral system counter 255. For example, when the count value of the 32-numeral system counter 255 is 3, the multiplexer 256 reads the 3rd bit value of the unique word UW from the D latch 2203 of the unique word holding circuit 222, and when the count value of the 32-numeral system counter 255 is 7, the multiplexer reads the 7th bit value of the unique word UW from the D latch 2207 of the unique word holding circuit 222.

By the way, the 32-numeral system counter 255 outputs the comparison finish signal CF indicating that the comparison is finished when the next clock CLK is inputted after the count value of its own becomes 31. The count value of the 32-numeral system counter 255 is reset to 0 when the coincidence detecting signal CD is outputted from the preamble code detecting circuit 202.

On the other hand, because the input data latch 257 holds 1-bit data inputted in synchronism with the clock CLK, the XOR gate 258 compares the bit value of the unique word UW read by the multiplexer 256 with the 1-bit data held in the input data latch 257 (Step ST5), and outputs the error signal E when uncoincidence occurs (Step ST6 and Step ST7).

The unique word detecting circuit 204 begins counting the number of outputs of error signal E outputted from the error detecting circuit 203 after it is once reset when the coincidence detecting signal CD is outputted from the preamble code detecting circuit 202 (Step ST8). When the comparison at the error detecting circuit 203 is finished, that is, when the comparison finish signal CF is outputted, in the case where the above-mentioned count value is 1 or less, the unique word detecting circuit 204 outputs the detecting signal DT indicating that the unique word has been detected (Step ST9 through Step ST12).

Specifically, because when the error signal E is outputted from the XOR gate 258, the input error latch 259 latches and outputs the error signal E at the falling edge of the clock CLK, the binary counter 260 counts 0 to 2 every time the error signal E is outputted from the input error latch 259 (Step ST8) and outputs the uncoincidence signal UCD when the count value becomes 2.

By the way, the count value of the binary counter 260 is reset to 0 when the coincidence detecting signal CD is outputted from the preamble code detecting circuit 202.

While the count value of the binary counter 260 does not become 2, in other words, no uncoincidence signal UCD is outputted (Step ST9) and the comparison finish signal CF is not outputted from the 32-numeral system counter 255, processings from Step ST5 to ST10 are repeated. With this operation, 32 bits of the external data ED are inputted.

The AND gate 261 outputs the detecting signal DT indicating that the unique word has been detected (Step ST12) when any comparison finish signal CF is outputted from the 32-numeral system counter 255 (Step ST10) and no uncoincidence signal UCD is outputted from the binary counter 260 (Step ST11). The detecting signal DT outputted from the AND gate 261 is inputted to the D latch 262 and is latched at the rising edge of the clock CLK as well as outputted to the outside.

When the count value of the binary counter 260 becomes 2 and the uncoincidence signal UCD is outputted (Step ST9) before the comparison finish signal CF is outputted from the 32-numeral system counter 255, the external data ED then inputted is judged as no unique word UW and processing returns to Step 1. Though the comparison finish signal CF is outputted from the 32-numeral system counter 255 when the uncoincidence signal UCD is outputted from the binary counter 260 (Step 11), the external data ED then inputted is also judged as no unique word UW and processing returns to Step 1.

As clear from the foregoing, according to the first embodiment of the unique word detecting apparatus of this invention described above, it is possible to detect the unique word with 1-bit error only by storing the original unique word UW, without storing 33 types of 32-bit data (UW, UW0 through UW31) as has been done with the conventional unique word detecting apparatus. Consequently, the size of the circuit required for comparing the unique word with the external data becomes extremely small. In the conventional unique word detecting apparatus, XNOR gates exceeding 1000 pieces are required but in the first embodiment of this invention, such XNOR gates are no longer necessary.

According to the first embodiment of the unique word detecting apparatus of this invention, because processing for detecting the unique word is carried out only when the preamble code transmitted before the unique word is detected, processing for detecting the unique word is not necessary except during the period in which the unique word is transmitted. Consequently, when processing for detecting the unique word is carried out with software, the load to the computer will be alleviated and the potential of affecting other processing will be reduced.

In the first embodiment mentioned above, the case in which the preamble code PR is 4 bits, but it may be 5 bits, 6 bits or more bits and is not limited to 4 bits. In such event, the number of D latches composing the 4-bit sift register (data holding means) 201 should be increased in accord with the number of bits of the preamble code PR.

In the first embodiment mentioned above, it is designed in such a manner that when the output number of error signals is 1 or less, the detecting signal DT indicating that the unique word has been detected is outputted, but this is to satisfy the requirements specified in the "STD-28" standard of the RCR and it is understood that it limits the present invention. When the above-mentioned standard is changed or when this invention is applied to any other standards, the number of outputs of error signals may be 2 or more and the same effects as achieved in the first embodiment will be achieved. In such event, the timing to-output uncoincidence signal UCD should be changed by replacing the binary counter 260 with a ternary, quaternary, or other counter.

In the above-mentioned first embodiment, no special mention was given on the change of the unique word UW held by the unique word holding circuit 222, but it is easy to allow the unique word holding circuit 222 to hold a different unique word UW by changing the setting because the value of each bit of the unique word UW held in the unique word holding circuit 222 of the error detecting circuit 203 is designed to be preset by the microcomputer 270 as changing means shown in FIG. 3.

With this design, even when the unique word to be transmitted is changed or this invention is applied to any other standards, the necessary change can be easily made without changing the configuration and the apparatus can detect any unique words.

Second Embodiment

Figure 6:
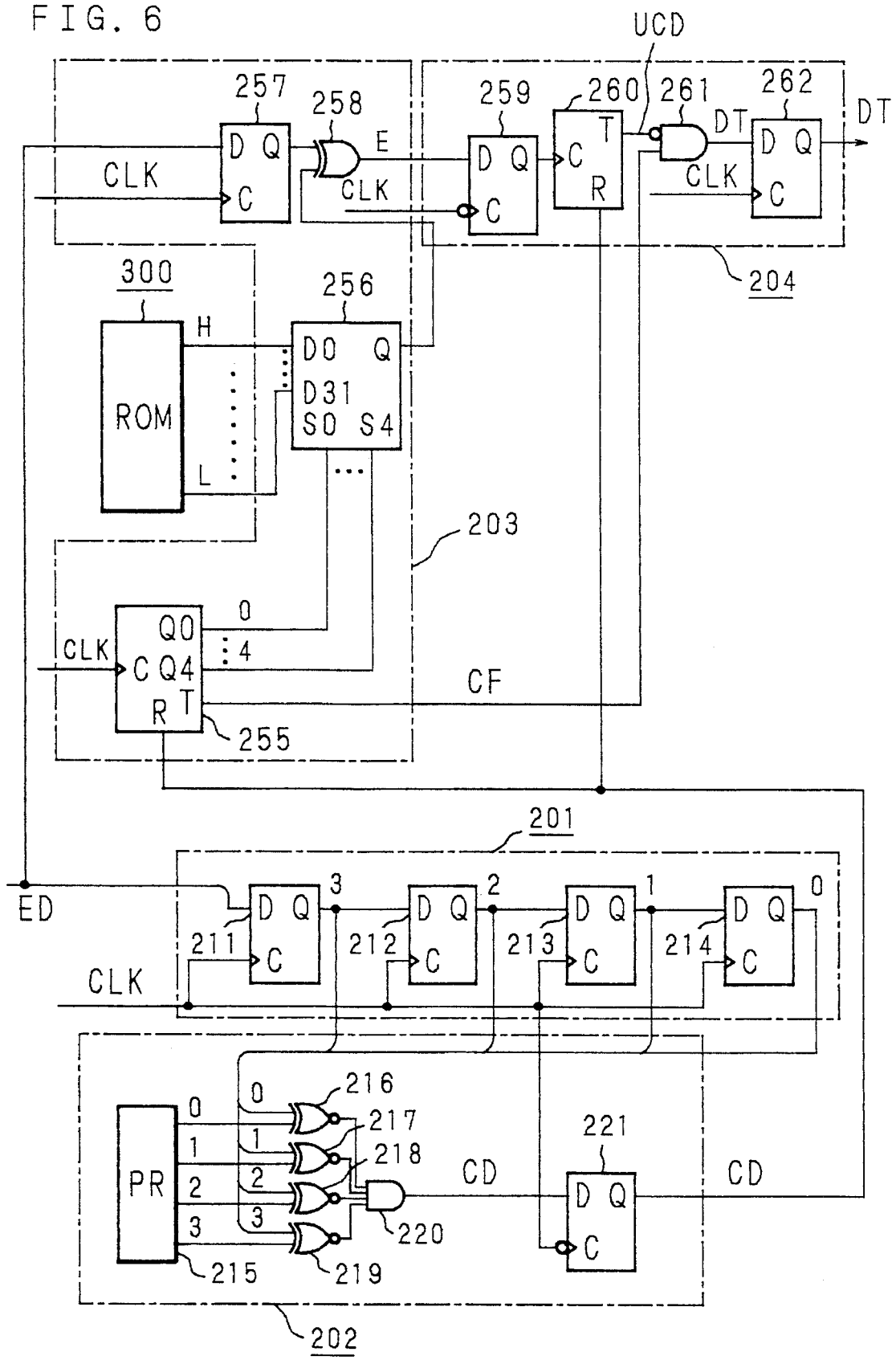
FIG. 6 is a circuit diagram showing a detailed configuration example of the second embodiment of the unique word detecting apparatus according to the present invention.

FIG. 6 is a circuit diagram showing a detailed configuration example of the second embodiment of the unique word detecting apparatus according to this invention.

In the first embodiment of the unique word detecting apparatus according to this invention whose circuit diagram of the detailed configuration example is shown in FIG. 4, the data as the unique word UW to be detected is designed to be inputted from the microcomputer 270 to the D latches 2200 through 2231 of the unique word holding circuit 222 so that it is held by the unique word holding circuit 222. However, when it is not necessary to take any change of the unique word UW into account, it is possible to use ROM 300 with the data of the unique word UW written in advance in place of the unique word holding circuit 222 as shown in FIG. 6. In this case, it is possible to further reduce the hardware than that in the first embodiment. For the ROM 300, not only general ROM but also EPROM or EEPROM may be used, and in such event, it is possible to meet the change of the unique word to some extent.

Third Embodiment

Figure 7:
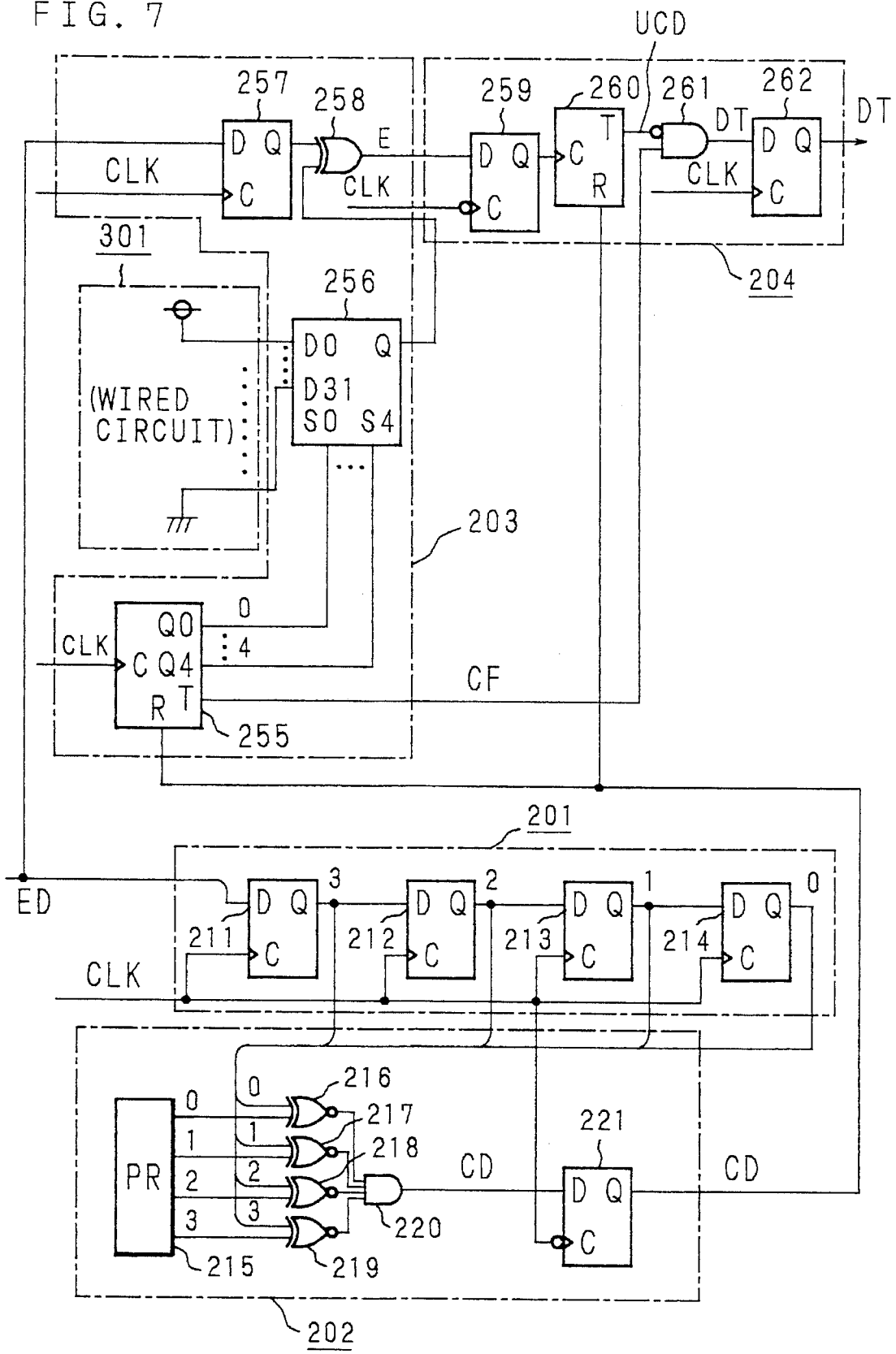
FIG. 7 is a circuit diagram showing a detailed configuration example of the third embodiment of the unique word detecting apparatus according to the present invention.

FIG. 7 is a circuit diagram showing a detailed configuration example of the third embodiment of the unique word detecting apparatus according to this invention.

In this third embodiment, in place of the unique word holding circuit 222 of the first embodiment of the unique word detecting apparatus according to this invention shown in FIG. 4, a wired circuit 301 in which 32 pieces of wire are connected to the power supply potential or grounding potential in correspondence to the data of the unique word UW. In such case, it is possible to further reduce the hardware than that in the second embodiment, not to mention in the first embodiment.

As described above, according to the first aspect of the unique word detecting apparatus of this invention, because the apparatus is designed to count the number of uncoincident bits by comparing the external data with the unique word successively bit by bit only when the preamble code transmitted before the unique word is detected and to output the detecting signal indicating that the unique word has been detected when the count value is equal to or less than the specified vale, it is possible to output the detecting signal as if the original unique word is transmitted even when complete coincidence with the original unique word is not achieved, and as a result, the circuit scale required for comparing the unique word with the data can be greatly reduced.

According to the second aspect of the unique word detecting apparatus of this invention, because the apparatus is designed to count the number of uncoincident bits by comparing the data with the unique word successively bit by bit and to output the detecting signal indicating that the unique word as been detected when the count value is 1 or less, it provides an effect to meet the TDMA digital communication in which the data is made effective as if the original unique word is transmitted when the error is 1 bit or less even when the unique word to be transmitted does not coincide completely with the original unique word.

According to the third aspect of the unique word detecting apparatus of this invention, because the apparatus is designed to provide means for changing the unique word held by the unique word holding means, it provides an effect to easily meet the change without changing the configuration and to detect any unique word even when the unique word to be transmitted is changed.

According to the fourth aspect of the unique word detecting apparatus of this invention, because the unique word holding means for holding the data of the unique word to be detected is configured with a ROM, the hardware can be more reduced.

According to the fifth aspect of the unique word detecting apparatus of this invention, because the unique word holding means for holding the data of the unique word to be detected is configured with a wired circuit, the hardware can be further reduced.

According to the unique word detecting method of this invention, because it is designed to compare the preamble code stored in advance with the data transmitted and to detect the unique word only when they coincide, no unique word detection processing is required except during the period in which the unique word is transmitted, and as a result, it provides an effect to alleviate the load of computers and reduce a potential of affecting other processing.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A unique word detecting apparatus for detecting a unique word from an external data in which the unique word is transmitted following a preamble code, comprising:

data holding means for inputting the external data bit by bit in synchronism with the clock, and for holding data of a predetermined number of bits;

preamble code detecting means for comparing the data of said preamble code stored in advance with the data of the predetermined number of bits held by said data holding means, and for outputting a coincidence detecting signal when they coincide;

unique word holding means for holding the data of the unique word to be detected;

error detecting means for inputting said external data bit by bit in synchronism with said clock, and for, when said coincidence detecting signal is outputted from said preamble code detecting means, comparing the inputted external data with the data of the unique word held by said unique word holding means and outputting an error signal in the case where they do not coincide; and unique word detecting means for beginning counting the number of outputs of error signal from said error detecting means when said coincidence detecting signal is outputted from said preamble code detecting means, and for outputting a detecting signal indicating that the unique word has been detected in the case where the count value is equal to or smaller than a predetermined value when the comparison of said error detecting means completes.

2. The unique word detecting apparatus as set forth in claim 1, wherein said predetermined value is 1.

3. The unique word detecting apparatus as set forth in claim 1, wherein said unique word holding means is composed of storing elements for storing the data of the unique word given from the outside, and further comprising changing means for changing the data of the unique word held in said unique word holding means.

4. The unique word detecting apparatus as set forth in claim 1, wherein:

said unique word holding means is composed of a ROM in which the data of the unique word is written in advance.

5. The unique word detecting apparatus as set forth in claims 1, wherein:

said unique word holding means is composed of a wired circuit with a plurality of signal lines, each connected to the power supply potential or grounding potential in such a manner that the signals corresponding to the data of the unique word are generated.

6. A unique word detecting method for detecting a unique word from an external data in which the unique word is transmitted following a preamble code, comprising steps of:

storing in advance said preamble code and the unique word to be detected;

inputted said external data to data holding means bit by bit in synchronism with a clock;

holding a predetermined number of bits of the inputted external data in the data holding means;

comparing said preamble code with the held data of the predetermined bit number;

inputting said external data to error detection means bit by bit in synchronism with said clock when the compared results coincide;

comparing the inputted external data with the stored unique word; and outputting a detecting signal indicating that the unique word has been detected when the number of uncoincidence of the comparison results is equal to or less than a predetermined value.

7. The unique word detecting method as set forth in claim 6, wherein said predetermined value is 1.

* * * * *